United States Patent [19]

Gibson

[11] Patent Number: 4,492,071
[45] Date of Patent: Jan. 8, 1985

[54] METHOD FOR PREPARING BLOCKS OF GLASS FOR SHIPMENT

[75] Inventor: Donald D. Gibson, Ann Arbor, Mich.

[73] Assignee: Ford Motor Company, Dearborn, Mich.

[21] Appl. No.: 535,093

[22] Filed: Sep. 23, 1983

[51] Int. Cl.³ .................. B65B 11/02; B65B 51/20; B65B 53/06
[52] U.S. Cl. .................... 53/442; 53/449; 53/463; 206/205; 206/497; 206/454
[58] Field of Search ........... 53/442, 463, 449, 461; 206/205, 497, 451, 454

[56] References Cited

U.S. PATENT DOCUMENTS

| 3,087,610 | 4/1963 | Kirkpatrick | 53/442 X |
| 3,171,749 | 3/1965 | Dreyfus et al. | 53/442 |
| 3,344,917 | 10/1967 | Raffet | 206/451 |
| 3,618,755 | 11/1971 | Metzger et al. | 53/442 X |
| 3,788,462 | 1/1974 | Meincer | 53/442 X |
| 3,809,223 | 5/1974 | Kendall | 53/442 X |
| 3,887,071 | 6/1975 | Thomaswick | 206/454 |
| 3,955,676 | 5/1976 | Hansen et al. | 206/454 |
| 4,018,337 | 4/1977 | Barnett | 53/442 X |
| 4,278,171 | 7/1981 | Milhoan | 206/454 X |
| 4,282,973 | 8/1981 | Binkowski | 53/442 X |

FOREIGN PATENT DOCUMENTS 7804749 8/1979 Sweden ................. 53/442

Primary Examiner—Horace M. Culver
Attorney, Agent, or Firm—William E. Johnson; Olin B. Johnson

[57] ABSTRACT

This specification discloses a method for preparing a plurality of large blocks of glass for shipment on a transportable device (10). The method includes providing an "A" frame carrier (18) on the transportable device. A plurality of layers of shrinkable film (32) and (34) are provided which lie over and on both sides of the "A" frame carrier. A block of glass is loaded on each side of the "A" frame carrier and wrapped in the layer (34) of shrinkable film in a manner that each of the first glass blocks is substantially enclosed in the shrinkable film. The shrinkable film is shrunk about the enclosed block of glass thereby to form a sealed pouch pack (36) about the first loaded block of glass. At least a second block of glass is loaded on each side of the "A" frame carrier in association with the previously loaded blocks of glass. Each of the newly loaded blocks of glass is wrapped in the layer (32) of the shrinkable film in a manner such that each of the newly loaded glass blocks is substantially enclosed in the shrinkable film. The shrinkable film is then shrunk about the substantially enclosed glass blocks thereby to form a sealed pouch pack (40—40) about each of the newly loaded glass blocks.

11 Claims, 9 Drawing Figures

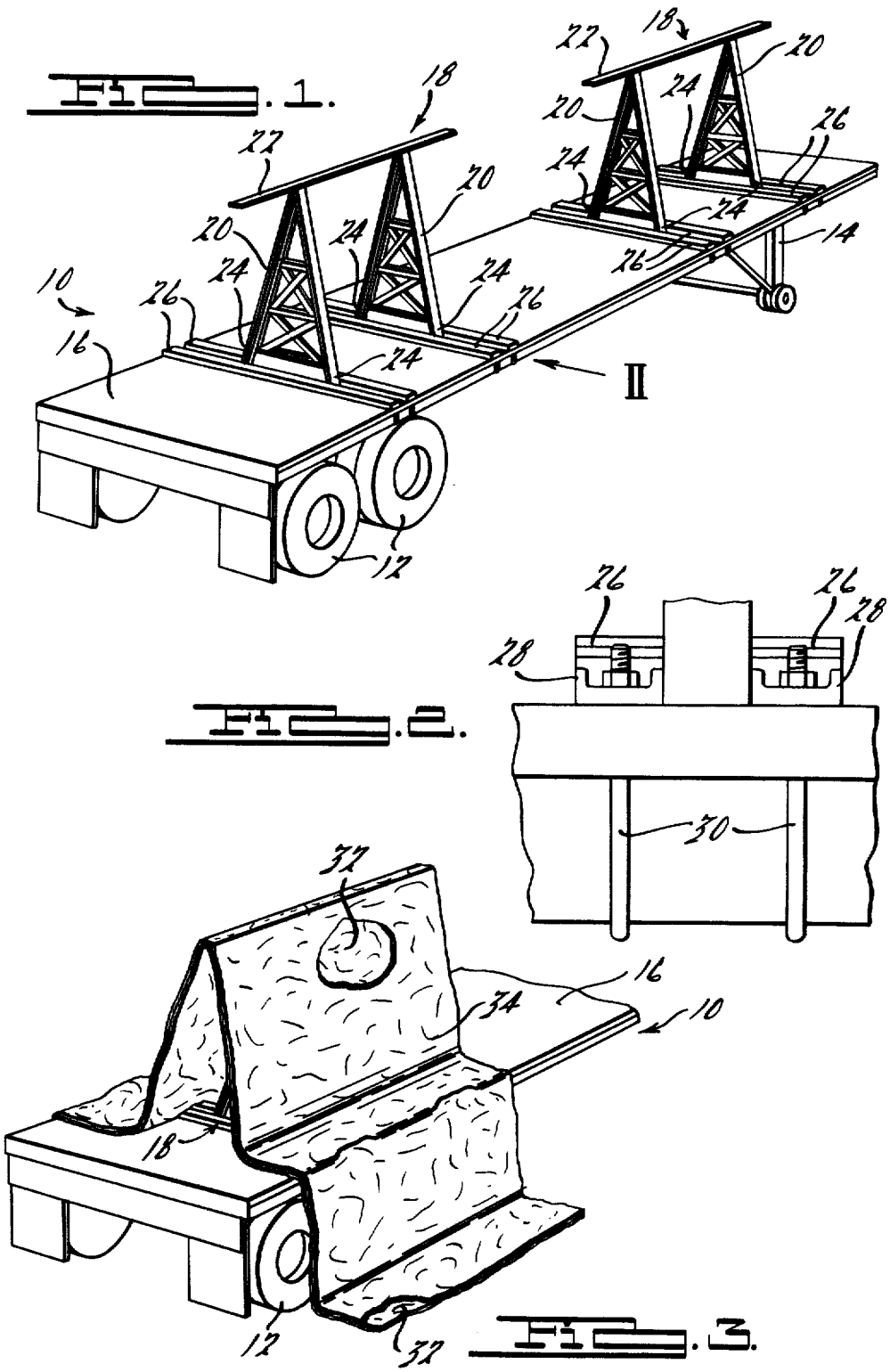

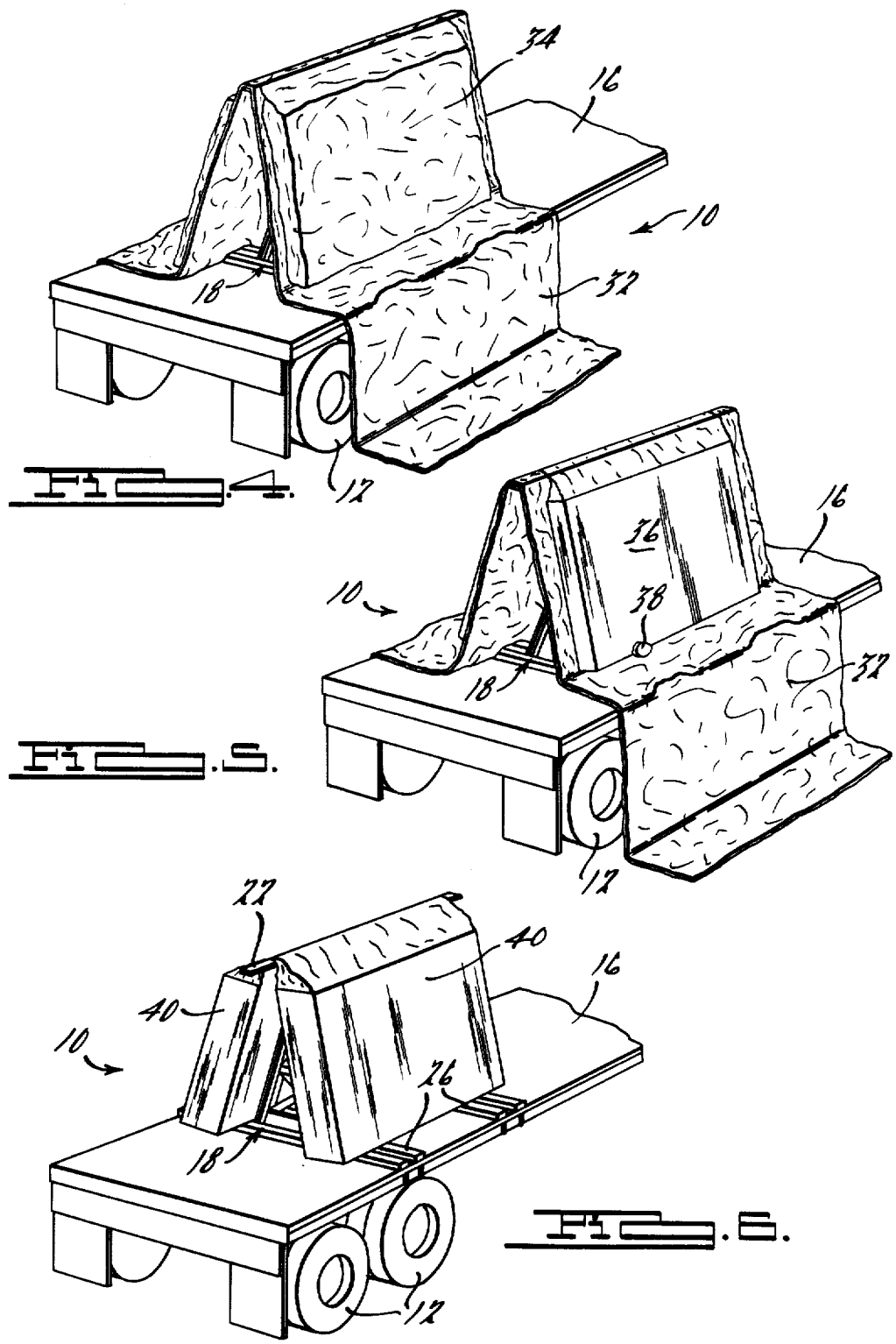

METHOD FOR PREPARING BLOCKS OF GLASS FOR SHIPMENT

TECHNICAL FIELD

This application is directed to a method for preparing a plurality of large blocks of glass for shipment and, more particularly, to a method for preparing a plurality of large blocks of glass for shipment on a transportable device. Normally the transportable device is a trailer which may be coupled to a suitable tractor so that the shipment of the large blocks of glass may be made over a road system.

BACKGROUND ART AND PRIOR ART STATEMENT

A search was conducted on the subject matter of this specification in the U.S. Patent and Trademark Office. As a result of that study, the following U.S. patents were cited: U.S. Pat. Nos. 3,344,917; 3,618,755; 3,887,071; 3,955,676; and 4,018,337. While I believe that none of the cited patents, either alone or in combination, teaches the method disclosed and claimed in this specification, I will briefly describe what is found in each cited patent.

U.S. Pat. No. 3,344,917 is directed to a packaged article as an article of manufacture. The packaged article includes a flat object to be packaged along with first and second sheets of stiff material of like shape and size as the object to be packaged but of larger transverse dimensions. The first and second sheets are disposed with their edges substantially in registration with the object to be packaged between them with its edges spaced inwardly from the edges of the first and second sheets, thereby to define a channel conjointly with the edge of the packaged object. A self-hardening material is disposed within this so-defined channel. The self-hardening material extends continuously therealong and adheres to the surfaces of the first and second sheets which it contacts, thereby to package the article.

U.S. Pat. No. 3,618,755 is directed to an improved structure for packaging glass sheets while ensuring the same against breakage and weathering during transportation or storage. The package of glass comprises a lot of individual sheets of glass arranged in face-to-face relationship. The package also includes layers of cushioning material covering exposed edge and surface areas of the lot of sheets. Also included is an envelope of plastic material enclosing and shrunk onto the covered lot of sheets. Strips of cushioning material cover edges of the plastic enclosed lot of sheets and a second envelope of plastic material encloses and is shrunk onto the edge covered plastic enclosed lot of sheets.

U.S. Pat. No. 3,887,071 is directed to an article transporting rack suitable for transporting sheets of glass. The patent shows a rather detailed construction for a rack which includes a frame, end restraint members, and a webbing restraint system to be used with the aforementioned members.

U.S. Pat. No. 3,955,676 is directed to an adjustable shipping rack and means for securing flat sheets thereto. Once again, this patent is directed to a rather detailed construction for a shipping rack for transporting groups of flat sheets of a frangible material such as glass. The shipping rack includes "A" frame members interconnected by adjustable cross-braces and other recited contruction to build the complex rack system set forth therein.

U.S. Pat. No. 4,018,337 is directed to a heat shrink packaging. The patent discloses a method of using a shrink wrap film to shrink wrap or bundle a load of articles or packages having a surface portion formed of the same material as the shrink wrapped film. The load is assembled and wrapped with a laminate comprising an outer ply formed of the shrink wrapped film and an inner barrier film formed of a material which will not fuse to any part of the load or the portions when subjected to film shrinking heat. The wrapped load is thereafter heated to shrink the laminate about the load.

None of the above patents discloses a method for preparing a plurality of large blocks of glass for shipment on a transportable device as is taught in this specification. This will become readily apparent upon further examination of the teachings of this specification.

DISCLOSURE OF THE INVENTION

This invention is directed to a method for preparing a plurality of large blocks of glass for shipment on a transportable device and is embodied in several different embodiments. Each of the embodiments will be disclosed in detail in a later portion of this specification.

It its broadest embodiment, the method for preparing a plurality of large blocks of glass for shipment on a transportable device is characterized in the following steps.

An "A" frame carrier is provided on the transportable device. A plurality of layers of shrinkable material are provided which lie over and on both sides of the "A" frame carrier.

A block of glass is loaded on each side of the "A" frame carrier. Each block of glass is wrapped in a layer of the shrinkable film in a manner such that each of the first glass blocks is substantially enclosed in the shrinkable film. The shrinkable film is then shrunk about the substantially enclosed block of glass, thereby to form a sealed pouch peak about each of the glass blocks.

At least a second block of glass is loaded on each side of the "A" frame carrier in association with the previously loaded blocks of glass. Each of the newly loaded blocks of glass is wrapped in a layer of the shrinkable film in a manner such that each of the newly loaded glass blocks is substantially enclosed in the shrinkable film. The shrinkable film is then shrunk about the substantially enclosed glass blocks, thereby to form a sealed pouch pack about each of the newly loaded glass blocks. A desiccant material may be placed in each of the pouch packs, if desired, to prevent moisture from forming inside of the pouch.

In accordance with a preferred method for preparing a plurality of large blocks of glass for shipment on a transportable device, the method is characterized in the following steps. An "A" frame carrier is provided on the transportable device. At least a lower layer and an upper layer of shrinkable film is provided which lies over and on both sides of the "A" frame carrier.

A block of glass is loaded on each side of the "A" frame carrier. Each block of glass is then wrapped in the upper layer of the shrinkable film in a manner such that each of the first glass blocks is substantially enclosed in the upper layer of shrinkable film. The shrinkable film is then shrunk about each of the substantially enclosed blocks of glass, thereby to form a first sealed pouch pack about each of the first glass blocks.

A second block of glass is loaded on each side of the "A" frame carrier in association with the previously sealed first pouch pack. Each of the newly loaded blocks of glass is wrapped in the lower layer of the shrinkable film in a manner such that each of the newly loaded glass blocks as well as the previously sealed first pouch pack is substantially enclosed in the lower layer of the shrinkable film. The shrinkable film is then shrunk about each of the substantially enclosed glass blocks and first pouch pack, thereby to form a second sealed pouch pack about each of the glass blocks and associated first pouch packs. Once again, a desiccant material may be incorporated in each of the pouch packs.

In accordance with a detailed embodiment of my method for preparing a plurality of large blocks of glass for shipment on a transportable device, my method is characterized by having the following steps.

An upstanding "A" frame carrier is provided on the transportable device. At least a lower layer and an upper layer of shrinkable film is provided which lies over and upon both sides of the upstanding "A" frame carrier.

A block of glass is loaded on each side of the upstanding "A" frame carrier. Each block of glass is wrapped in the upper layer of the shrinkable film in a manner such that each of the first glass blocks is substantially enclosed in the upper layer of the shrinkable film. The shrinkable film is shrunk about each of the substantially enclosed blocks of glass, thereby to form a first sealed pouch pack about each of the first glass blocks, whereby the first sealed pouch packs are secured to the upstanding "A" frame carrier.

A second block of glass is loaded on each side of the upstanding "A" frame carrier in association with the previously sealed first pouch pack. Each of the newly loaded blocks of glass is wrapped in the lower layer of the shrinkable film in a manner such that each of the newly loaded glass blocks as well as the previously loaded sealed first pouch pack are substantially enclosed in the lower layer of the shrinkable film. The shrinkable film is shrunk about each of the substantially enclosed glass blocks and first pouch packs, thereby to form a second sealed pouch pack about each of the glass blocks and associated first pouch packs. In this manner, the sealed second pouch packs are secured to the upstanding "A" frame carrier.

The second sealed pouch packs and the upstanding "A" frame carrier to the which the sealed pouch packs are secured are encircled with a layer of the shrinkable film. The shrinkable film is shrunk about the second sealed pouch packs and upstanding "A" frame carrier to which they are secured, thereby to define a final package for the packaged glass blocks. Once again, a desiccant material may be placed in each of the pouch packs.

A still further embodiment is a method in which the final package of glass is so constructed that it has aerodynamic qualities when moving on a transportable device through an air stream (such as when the transportable device is a trailer which can be coupled to a tractor for movement over a road system).

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures, and in which:

FIG. 1 shows a trailer to which two "A" frame carriers have been attached;

FIG. 2 is a cross-section view taken along line II of FIG. 1 showing the detailed manner in which the "A" frame carriers are attached to the trailer;

FIG. 3 shows a plurality of layers of a shrinkable film lying over and on both sides of one of the "A" frame carriers on the trailer;

FIG. 4 shows a block of glass mounted on the "A" frame carrier and wrapped in a layer of the shrinkable film;

FIG. 5 shows the shrinkable film shrunk about the first loaded block of glass;

FIG. 6 shows a second block of glass loaded on the trailer with a shrinkable film wrapped and shrunk therearound;

BEST MODE AND INDUSTRIAL APPLICABILITY

Figure 7:
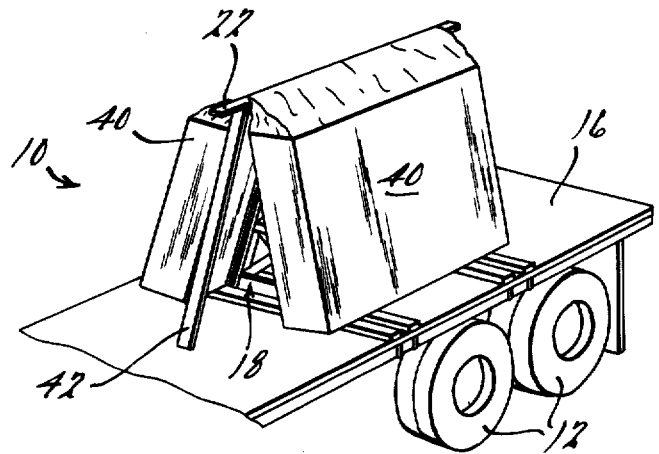
FIG. 7 shows a method in which the aerodynamics of carrying the wrapped blocks of glass are improved.
Figure 8:
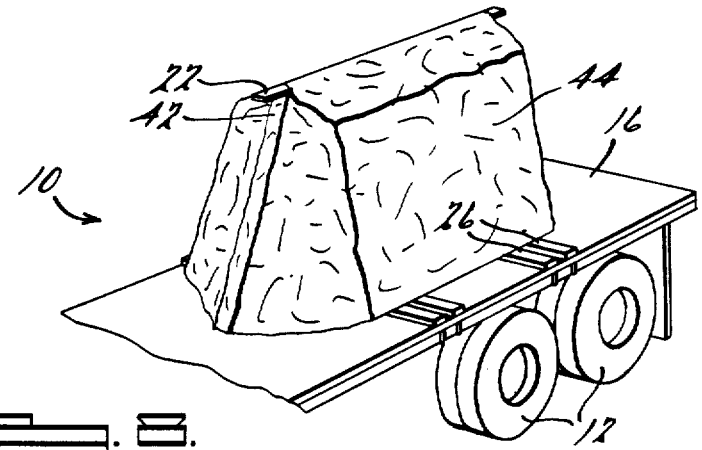
FIGS. 8 and 9 shows the application of an additional layer of shrinkable film, the shrinkable film being wrapped around and over previously packaged blocks of glass so as to provide an aerodynamic packaging for the glass.

The following description is what I consider to be a preferred embodiment of the method for preparing a plurality of large blocks of glass for shipment on a transportable device in accordance with my inventive concept. The following description also sets forth what I now contemplate to be the best mode of carrying out my inventive method. This description is not intended to be a limitation upon the broader principles of this method, and while preferred materials are used to carry out the method for preparing a plurality of large blocks of glass for shipment on a transportable device as is required by the patent laws, it does not mean that other materials cannot be used to carry out the method of this invention.

The method of my invention is one for preparing a plurality of large blocks of glass for shipment on a transportable device. A transportable device may be any type of device which can be moved in commerce from a shipping point to a receiving point. For example, a transportable device might be a trailer for a tractor, as will be illustrated in the preferred embodiments of the invention, or it could be a shipping container which can be transported in a ship, or a railroad car, or any other type of device which can be moved in commerce. By large blocks of glass I mean a plurality of sheets of glass packaged together in a single block. Normally glass sheets having sizes of 96 by 130 inches, or smaller, are formed into a block of glass by piling such sheets together. The glass sheets may be bound into the block by a retaining crate, retaining straps, or any other type of device known for associating a plurality of sheets of glass.

In accordance with the preferred embodiment, the transportable device is a trailer generally identified by the numeral 10. In a parked condition, the trailer is supported on rear wheels 12 and a movable supporting device 14 well known in the art. A flat bed 16 of the trailer supports thereon a pair of upstanding "A" frame carriers generally identified by the numerals 18—18. These carriers are best seen in FIG. 1 which shows two of the carriers on the flat bed of the trailer. The other drawings show only one of the carriers.

With reference to FIG. 1, each of the "A" frame carriers 18—18 are made up of two "A" frame members 20—20. The "A" frame members are free standing but do support at their tops a top strut 22. Feet 24—24 of each "A" frame member are captured between cross-brace members 26—26 which extend along the flat bed 16 of the trailer 10 from one side edge to the other side edge.

As best seen in FIG. 2, the cross-brace members 26—26 are secured to a channel defined along the lateral edges of the flat bed 16 of the trailer 10 by means of nuts 28—28 and J bolts 30—30 in a manner well known in the art. The J bolts hook underneath the structure defining the flat bed of the trailer in a manner well known in the art. In this manner, the cross-brace members are used to capture the feet 24—24 of each "A" frame member to hold the same in a stabilized position on the flat bed of the trailer.

Thus the first step in the method of my invention is that of providing at least one upstanding "A" frame carrier on a transportable device. In this case, in the preferred embodiment, a pair of such "A" frame carriers 18—18 are provided on a trailer 10.

The next step of my method is illustrated in FIG. 3. This figure shows that at least a lower layer 32 and an upper layer 34 of shrinkable film is provided. The two layers of film are provided in a manner in which they lie over and upon both sides of the upstanding "A" frame carrier 18 located on the flat bed 16 of the trailer 10. By a shrinkable film I means a film which will shrink when heated or subjected to other external processing which causes the film to shrink down upon itself. Examples of such film is polyethyene, which is a heat shrinkable film. Another film that is shrunk by radiation is polyvinylchloride. Normally, in transporting glass blocks, the film thickness should be about 8 mils or greater so that the film has the packaging characteristics of retaining up to 4,000 pounds of glass sheets per layer of film.

The next step in the method of my invention, as illustrated in this preferred embodiment, is that of loading a block of glass on each side of the upstanding "A" frame carrier 18 mounted on the flat bed 16 of the trailer 10. The results of this step and the next step of my method is illustrated in FIG. 4. In FIG. 4 there is seen a wrapping of each of the blocks of glass (the one on the right side of the carrier being illustrated best) in the upper layer 34 of shrinkable film in a manner such that each of the first glass blocks are substantially enclosed in the upper layer of the shrinkable film. The first glass blocks may be placed in association with the "A" frame carrier by means of any suitable crane type device which swings the glass up into the proper position. An operator is then required to fold the shrinkable film around that glass so that the glass block is substantially enclosed in the upper sheet of film 34 as is illustrated in the drawing. If desired, a small bag of a desiccant material may be placed next to the glass block prior to wrapping it so that any moisture trapped inside may be taken up by the desiccant.

The shrinkable film of the preferred embodiment is a heat shrinkable film such as 8 mil polyethylene. In order to shrink the film, the operator applies heat to it from a portable heat source such as a propane or electric powered heat cannon. The shrinkable film is shrunk about each of the substantially enclosed blocks of glass, thereby to form a first sealed pouch pack 36 about each of the first glass blocks. This first sealed pouch pack is secured to the upstanding "A" frame carrier 18 by means of the sheet material passing over the top strut 22 between the two "A" frame members 20—20. This sealed first pouch pack is illustrated in FIG. 5. Also illustrated in FIG. 5 is the addition of a desiccant pouch 38 which will be sealed in the next pouch pack for moisture scavenging purposes.

FIG. 6 illustrates the results of carrying out the next steps of the method of my invention as illustrated in this preferred embodiment. The steps would include loading a second block of glass on each side of the upstanding "A" frame carrier 18 supported on the flat bed 16 of the trailer 10. This second block of glass would be loaded in association with the previously sealed first pouch pack 36. The second block of glass may be made up of one or more units as desired. Each of the newly loaded blocks of glass is then wrapped in the lower layer 32 of the shrinkable film in a manner such that each of the newly loaded blocks of glass as well as the previously sealed first pouch pack 36 are substantially enclosed in the lower layer 32 of the shrinkable film. The shrinkable film is once again shrunk by heating about each of the substantially enclosed blocks of glass and first pouch packs, thereby to form a second sealed pouch pack 40 seen in FIG. 6. This second sealed pouch pack, in accordance with the preferred embodiment, contains the second block of glass and the first sealed pouch pack. All of these elements are secured to the upstanding "A" frame carrier 18 because of the heat sealing of various layers over the top strut 22 which extends between two "A" frame members 20—20 of each "A" frame carrier 18.

With the addition of a few securement straps over the top of the packaged material, as is normally done in shipment of any devices on a trailer, the blocks of glass are now ready for shipment via the trailer.

If one desires to lend greater protection to the package system and to improve the aerodynamics of the system for transportation on the transportable device, I propose some additional steps in the preferred embodiment. These steps need not be carried out, but I believe that it improves the entire packaging if it is in fact carried out.

Figure 9:
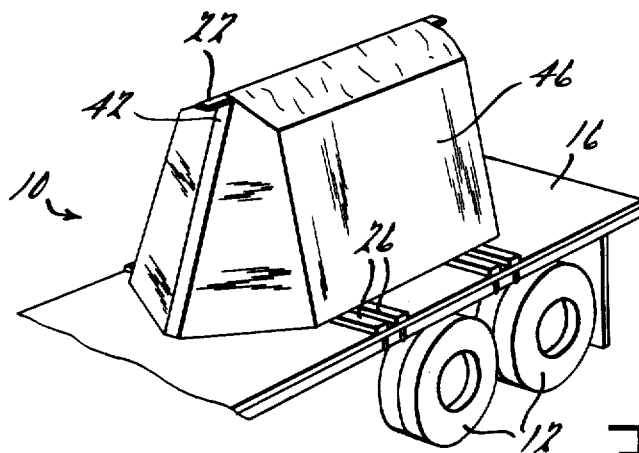

As best seen in FIG. 7, the direction of the trailer 10 has been reversed from the previous figures in order to illustrate a manner in which the second sealed pouch packs 40—40 may be made more secure and more aerodynamic for moving through the air when transported on the flat bed 16 of the trailer 10. In this case, a strut 42 is added which extends down from the top strut 22 of the front "A" frame member 20 to a position on the flat bed 16 of the trailer 10. The strut 42 is angled outwardly like the prow of a ship. Shrinkable film material 44 is then wrapped around the entire structure including the two second sealed pouch packs 40—40 and the vertical strut 42. A single or double layer of the material may be utilized. After wrapping in the shrinkable film 44, the film is shrunk to define a finished aerodynamic package 46, best seen in FIG. 9, which has the general configuration of a small row boat turned upside down on top of the flat bed of the trailer.

As another alternative to the method of my invention, the shrinkable film may be wrapped around the two second sealed pouch packs 40—40 without the utilization of the strut 42. Such action increases the overall strength of the packaged glass material and provides an excellent securement of that packaged glass material on the "A" frame carrier 18. However, it does not develop an aerodynamic package as is the case when the strut 42 is employed in association with the shrinkable film 44 wrapped around the previously sealed pouch packs.

While particular and preferred embodiments of the invention have been illustrated and described, it will be obvious to those skilled in the art that various changes and modifications may be made to my method, and it is intended to cover in the appended claims all such modifications and equivalents as fall within the true spirit and scope of this invention. My method may be used to ship sheets of other products such as large plastic sheets, metal sheets, plywood, plaster board, and any other similar articles.

I claim:

1. A method for preparing a plurality of large blocks of glass for shipment on a transportable device, which method is characterized in the following steps:

providing an "A" frame carrier on the transportable device;

providing a plurality of layers of shrinkable film lying over and on both sides of said "A" frame carrier;

loading a block of glass on each side of said "A" frame carrier;

wrapping each block of glass in a layer of said shrinkable film in a manner such that each of said first glass blocks is substantially enclosed in said shrinkable film;

shrinking said shrinkable film about said substantially enclosed block of glass thereby to form a sealed pouch pack about said glass block;

loading at least a second block of glass on each side of said "A" frame carrier in association with said previously loaded blocks of glass;

wrapping each of said newly loaded blocks of glass in a layer of said shrinkable film in a manner such that each of said newly loaded glass blocks is substantially enclosed in said shrinkable film; and shrinking said shrinkable film about said substantially enclosed glass blocks thereby to form a sealed pouch pack about said newly loaded glass blocks.

2. The method of claim 1, in which a desiccant is included in each of the sealed pouch packs.

3. A method for preparing a plurality of large blocks of glass for shipment on a transportable device, which comprises:

providing an "A" frame carrier on the transportable device;

providing at least a lower layer and an upper layer of shrinkable film lying over and on both sides of said "A" frame carrier;

loading a block of glass on each side of said "A" frame carrier;

wrapping each block of glass in said upper layer of said shrinkable film in a manner such that each of said first glass blocks is substantially enclosed in said upper layer of shrinkable film;

shrinking said shrinkable film about each of said substantially enclosed blocks of glass thereby to form a first sealed pouch pack about each of said first glass blocks;

loading a second block of glass on each side of said "A" frame carrier in association with said previously sealed first pouch pack;

wrapping each of said newly loaded blocks of glass in said lower layer of said shrinkable film in a manner such that each of said newly loaded glass blocks as well as said previously sealed first pouch pack is substantially enclosed in said lower layer of said shrinkable film; and shrinking said shrinkable film about each of said substantially enclosed glass blocks and first pouch pack thereby to form a second sealed pouch pack about each of said glass blocks and associated first pouch packs.

4. The method of claim 3, in which a desiccant is included in each of the sealed pouch packs.

5. The method of claim 3, in which the following steps are added:

wrapping around said second pouch packs and "A" frame carried secured therebetween a layer of shrinkable film; and shrinking said shrinkable film about said second pouch packs.

6. The method of claim 5, in which the following step is added prior to a wrapping and shrinking of the shrinkable film into contact with the second pouch packs:

placing a strut from the top of said "A" frame carrier to the floor of the transportable device, said strut being placed at an angular attitude with respect to the floor of the transportable device, said strut also being placed in association with that part of said "A" frame carrier facing the front of the transportable device.

7. A method for preparing a plurality of large blocks of glass for shipment on a transportable device, which comprises:

providing an upstanding "A" frame carrier on the transportable device;

providing at least a lower layer and an upper layer of shrinkable film lying over and upon both sides of said upstanding "A" frame carrier;

loading a block of glass on each side of said upstanding "A" frame carrier;

wrapping each block of glass in said upper layer of said shrinkable film in a manner such that each of said first glass blocks is substantially enclosed in said upper layer of said shrinkable film;

shrinking said shrinkable film about each of said substantially enclosed block of glass thereby to form a first sealed pouch pack about each of said first glass block, whereby said first sealed pouch packs are secured to said upstanding "A" frame carrier;

loading a second block of glass on each side of said upstanding "A" frame carrier in association with said previously sealed first pouch pack;

wrapping each of said newly loaded blocks of glass in said lower layer of said shrinkable film in a manner such that each of said newly loaded glass blocks as well as said previously sealed first pouch pack are substantially enclosed in said lower layer of said shrinkable film;

shrinking said shrinkable film about each of said substantially enclosed glass blocks and first pouch packs thereby to form a second sealed pouch pack about each of said glass blocks and associated first pouch packs, whereby said second sealed pouch packs are secured to said upstanding "A" frame carrier;

encircling said second sealed pouch packs and said upstanding "A" frame carrier to which they are secured with a layer of said shrinkable film; and shrinking said shrinkable film about said second sealed pouch packs and upstanding "A" frame carrier to which they are secured thereby to define a final package for the packaged glass blocks.

8. The method of claim 5, in which a desiccant is included in each of the sealed pouch packs.

9. The method of claim 7, in which the following steps are added:
wrapping around said second pouch packs and "A" frame carried secured therebetween a layer of shrinkable film; and
shrinking said shrinkable film about said second pouch packs.

10. The method of claim 9, in which the following step is added prior to a wrappng and shrinking of the shrinkable film into contact with the second pouch packs:
placing a strut from the top of said "A" frame carrier to the floor of the transportable device, said strut being placed at an angular attitude with respect to the floor of the transportable device, said strut also being placed in association with that part of said "A" frame carrier facing the front of the transportable device.

11. A method for preparing a plurality of large blocks of sheets of a product for shipment on a transportable device, which method is characterized in the following steps:
providing an "A" frame carrier on the transportable device;
providing a plurality of layers of shrinkable film lying over and on both sides of said "A" frame carrier;
loading a block of sheets of a product on each side of said "A" frame carrier;
wrapping each block of sheets of a product in a layer of said shrinkable film in a manner such that each of said first product blocks is substantially enclosed in said shrinkable film;
shrinking said shrinkable film about said substantially enclosed block of product, thereby to form a sealed pouch pack about said product block;
loading at least a second block of sheets of a product on each side of said "A" frame carrier in association with said previously loaded blocks of product;
wrapping each of said newly loaded blocks of product in a layer of said shrinkable film in a manner such that each of said newly loaded product blocks is substantially enclosed in said shrinkable film; and
shrinking said shrinkable film about said substantially enclosed product blocks, thereby to form a sealed pouch pack about said newly loaded product.

* * * * *